United States Patent [19]

Schwaller

[11] Patent Number: 5,247,430
[45] Date of Patent: Sep. 21, 1993

[54] LIGHT PLANT FOR BICYCLES INCLUDING A DYNAMO

[75] Inventor: Edwin Schwaller, Kuttigen, Switzerland

[73] Assignee: Vereinigte Drahtwerke, A.G., Biel, Switzerland

[21] Appl. No.: 710,677

[22] Filed: Jun. 5, 1991

[30] Foreign Application Priority Data

Jun. 7, 1990 [CH] Switzerland ............... 1913/90

[51] Int. Cl.⁵ .............................................. B62J 6/00
[52] U.S. Cl. ..................................... 362/72; 362/183; 315/78
[58] Field of Search ............... 362/72, 234, 276, 295, 362/183, 193; 315/78, 79; 320/9

[56] References Cited

U.S. PATENT DOCUMENTS 3,904,920  9/1975  Griffith .......................... 362/72 X
4,860,176  8/1989  Bauwens et al. .................... 362/72

FOREIGN PATENT DOCUMENTS 0141455  5/1985  European Pat. Off. .
2050088  12/1980  United Kingdom .
2161040  1/1986  United Kingdom .

Primary Examiner—Stephen F. Husar
Attorney, Agent, or Firm—Ladas & Parry

[57] ABSTRACT

The bicycle light plant includes a front light and a rear light having a set rated voltage, which lights are connected via a current circuit to a dynamo. The current circuit includes a switching controller which lets the voltage of the dynamo pass uncontrolled if it is below the rated voltage of the bulbs and stabilizes the voltage upon reaching or exceeding, the rated value practically without losses onto voltage level corresponding to this rated value. Accordingly, overvoltage at the bulbs can be prevented. Possible excessive output is not taken from the dynamo or is used for charging of batteries.

7 Claims, 9 Drawing Sheets

LIGHT PLANT FOR BICYCLES INCLUDING A DYNAMO

BACKGROUND OF THE INVENTION

1. Field of the Invention

The present invention relates to a light plant for bicycles having an electric circuit, which includes at least one front light, a rear light and a dynamo adapted to be driven by the bicycle, and a voltage limiting circuitry for the light voltage.

2. Description of the Prior Art

Such plants are known in a variety of designs, specifically also as parking light plants. In this respect attention is drawn to the German patent specifications DE-A 31 14 767 and DE-A-31 06 569. From these disclosures the problem relating to strongly fluctuating supply voltages and corresponding small or fluctuating light output of the bulbs operated thereby are known. In order to obviate these drawbacks electronically operating voltage and current limiting devices in the form of zener diodes have been proposed, by means of which harmful voltage peaks were not supplied to the bulb. On the other hand, it was foreseen in case of a supply by batteries to switch additional batteries in upon a decrease of the voltage. In these generally known plants it was necessary to limit the voltage to the lower level of the battery voltage, whereby in case of higher voltages the electrical power remained unused or was dissipated. This is inefficient, specifically if the light plant for bicycles shall also lend itself to be operated by rechargeable batteries.

SUMMARY OF THE INVENTION

Therefore, it is an object of the invention to provide a light plant for bicycles, in which at any operational condition an optimal light yield at all speeds can be combined with a minimal dynamo resistance and optimal charging conditions in case that rechargeable batteries are used such that the lifetime of the battery can be increased and generally the bulbs are protected.

A further object of the invention is to provide a light plant for bicycles, which lends itself to be designed based on the same basic circuitry of various modifications which are compatible with already existing parts of plants such that existing bicycles may also be equipped therewith.

Still a further object of the invention is to provide a light plant for bicycles, in which low inherent losses occur and which can be switched in such a way that in case of use of rechargeable batteries it runs continuously without substantially influencing the resistance against the movement or running.

Yet a further object is to provide a light plant for bicycles, which comprises at least one switching controller arranged between the dynamo and the front and the back lights, which switching controller is adapted to stabilize the voltage of the dynamo upon reaching or exceeding, a rated voltage of the lights substantially without any losses to a voltage level which corresponds to the rated voltage.

The use of a dynamo with an approximately linear characteristic in combination with a switching controller which stabilizes the voltage allows a specifically efficient operation of the bicycle light plant, in combination with a rechargeable battery or without such a battery.

By the stabilizing of the voltage to a predetermined level corresponding to the rated value of the lamps the excess output is not dissipated, it is rather not taken from the dynamo at all or then possibly used for the charging of batteries. Correspondingly, not only the voltage but also the resistance of the dynamo against rotation are stabilized to an optimal value.

The output voltage of the dynamo is measured by means of a threshold switch and converted into at least two, preferably three, switching states of the plant, which states each are adjusted optimally to the respective generated voltage.

The dynamo can be designed as a continuously running hub dynamo. The output generated therewith is sufficient at an optimal utilization for a running operation as well as for a parking light operation.

The bicycle light plant can be produced in various design modes, i.e. with one or two lamps for the front light, with or without rechargeable batteries and with or without any control logic such that it can be combined, depending on the design mode with generally available dynamos and lamps.

In one design mode a charging apparatus for the rechargeable batteries is switched via the control logic, depending on the prevailing running and operating state of the bicycle to various loading cycles. By each means, the charging procedure and the operating state of the lamps as well may be optimally adjusted to the running state such that during a normal, cyclic running behavior the running light and the parking light as well are guaranteed to be in a condition corresponding to legal standards.

BRIEF DESCRIPTION OF THE DRAWINGS

The invention will be better understood and objects other than those set forth above will become apparent when consideration is given to the following detailed description thereof. Such description makes reference to the annexed drawings, wherein.

DESCRIPTION OF THE PREFERRED EMBODIMENTS

Figure 1:
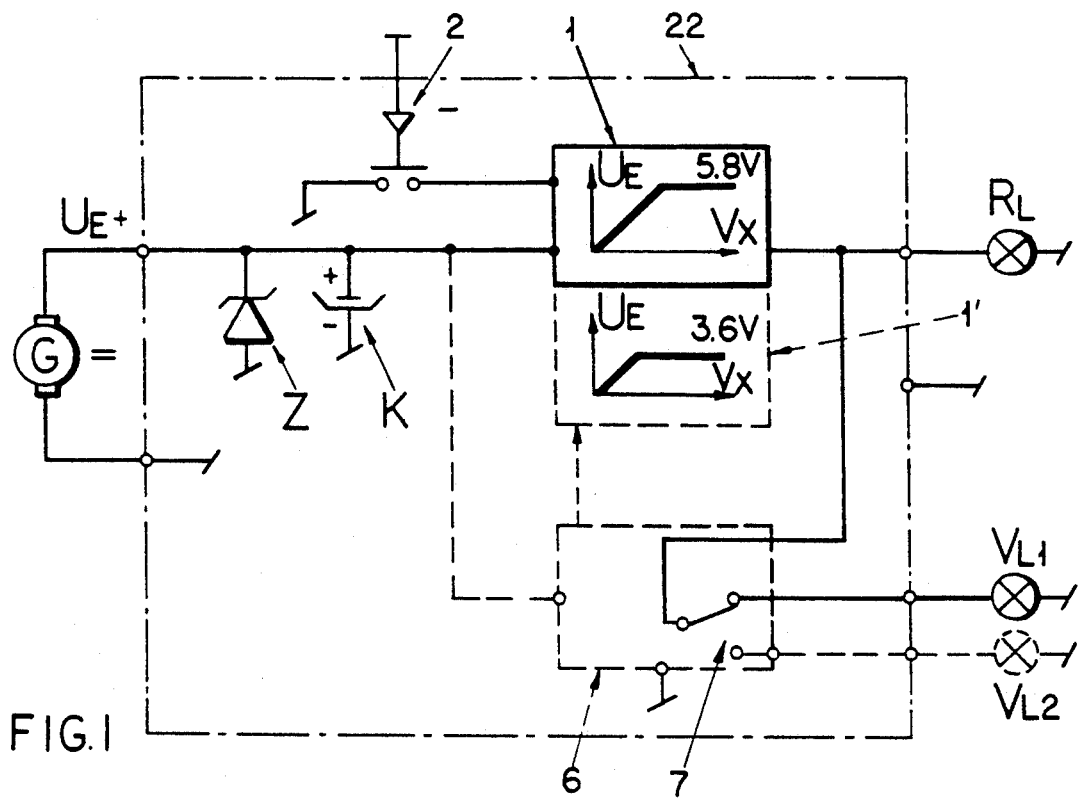
FIG. 1 illustrates a base circuit for a first arrangement, whereby a second design embodiment is drawn with broken lines.

Firstly, the operation of a basic circuit of the light plant will hereinbelow be explained with reference to FIGS. 1 to 3. This basic circuit represents at the same time a first design mode of the plant.

The light plant comprises a generator G, designed as dynamo for a bicycle such as will be explained more in detail further below. This dynamo supplies after rectification a DC-voltage $U_E$ or a DC-current, respectively, whose magnitude increases when the running speed of the bicycle increases. By means of a condensor K at the output side the output voltage $U_E$ can additionally be smoothened and by means of a zener diode Z the electronics can be protected from an overvoltage.

The voltage-speed-characteristic curve K of the dynamo used (see FIG. 6) causes overvoltages to be generated at higher speeds, which would destroy the light bulbs of the bicycles and which would not correspond to the legal standards.

In accordance with the invention, however, it is specifically the generation of overvoltages which is used for a more efficient operation of the light plant. In order to achieve this, a switching controller 1 is switched in between the dynamo G and the lamps $R_L$ (rear light) and $V_{L1}$, and $V_{L2}$, respectively, (front light), which switching controller 1 can be switched on and off via a switch 2. If it is switched off, the switching controller 1 acts as an opened switch and the bulbs are not connected to the dynamo G. If it is switched on, it stabilizes the voltage almost without any losses to a selectable value.

Figure 2:
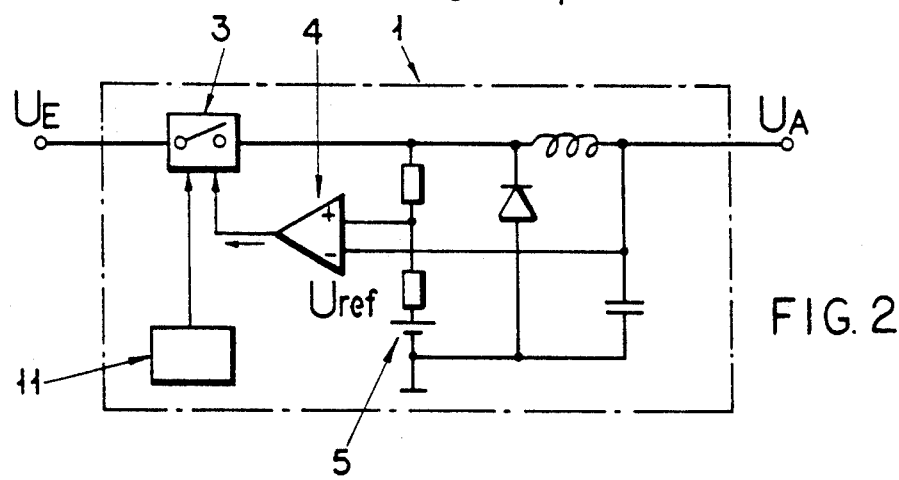
FIG. 2 is a schematic illustration of the circuitry of the switching controller of FIG. 1.
Figure 3:
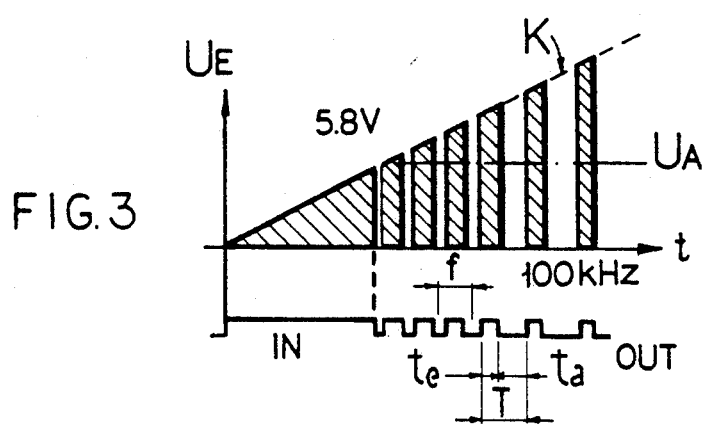
FIG. 3 is a diagram illustrating the operation of the switching controller according to FIG. 2.

With reference to FIGS. 2 and 3 the operation of such a switching controller will be explained hereinbelow in an exemplary manner.

Up to a desired output voltage $U_A$ (in the present example 5.8 V) an electronic switch 3 is continuously closed. The voltage of the dynamo can increase in this range without any losses until the desired output voltage $U_A$ has been reached. If the voltage of the dynamo increases still further (FIG. 3), the electronic switch 3 is opened and again closed by an oscillator 11 in a set switching frequency of e.g. 100 KHz.

Thereby, the pulse duty factor te/T is changed as a function of the input voltage $U_E$ and specifically such that the mean value of the voltage impulses which are led to pass through correspond to the stabilized output voltage $U_A$. At the same time a current limitation is also coupled therewith. The voltage impulses are converted in an LC-filter to a DC-voltage $U_A$. A corresponding control circuitry for the adjustment of the pulse duty factor by means of an operational amplifier 4 and of a reference voltage source 5 is illustrated in FIG. 2. The control amplifier is preferably designed according to a C-MOS-technique and operates at an efficiency more than 90%.

If the voltage $U_E$ of the dynamo exceeds the desired output voltage $U_A$, the electrical output is accordingly not dissipated, the dynamo is rather relieved, wherewith also the electromotive force in the dynamo and accordingly the running resistance are correspondingly limited to an optimal value. If the dynamo G operates in this range, the bulbs of the front light and the rear light burn at a constant brightness. The nominal values for the lamps are e.g. 6 V/2.5 W for the front light and 6 V/0.6 W for the rear light, which values are tuned to this stabilized voltage.

If the running speed decelerates, a voltage is generated in dependence upon the speed which lies between 0 and 5.8 V. The more the voltage falls below the rated voltage of the bulbs, the less bright they burn. Accordingly, there exists the danger of a too weak light, and this specifically increased because the larger the deviation from the rated value of the lamps, the more the light yield decreases. In order to prevent such occurrence a threshold switch 6 is provided in a second design mode of the described plant (see FIG. 1 or 4), which senses the voltage of the dynamo. In the example of FIG. 1 completed by broken lines, the threshold switch 6 generates two states and the front light includes bulbs (or one bulb having two filaments) having differing nominal or rated voltages. The switch controller includes two stabilizing levels corresponding to these rated voltages. Hereinbelow these two levels are differentiated from each other by the identification switch controller 1 for the first and switching controller 1' for the second stage. If the voltage is below a value $V_{X1}$ (=4.5 V in this example), it is stabilized by the switching controller 1' to 3.6 V and is connected via a switch 7 to the first bulb of the front light $V_{L1}$ having a low rated voltage (in the example 3.6 V, 1 W). If the voltage exceeds the value $V_{X1}$, it is switched via the switching controller 1 to the second bulb $V_{L2}$ which has the higher rated voltage (=6, V; 2.5 W in this example). If the voltage falls under a value $V_{X2}$ (4.2 V in this example), the procedure runs in the opposite way. A hysteresis of about 0.3 V between the switching voltages $V_{X1}$ and $V_{X2}$ avoids a continuous switching and thus a flickering of the light in case the generated voltage of the dynamo fluctuates in the corresponding range.

If now two bulbs are used for the front light, it is possible to differentiate basically between three states of operation. If the voltage of the dynamo is in a range between 0 and 4.5 V, the voltage is stabilized at a low level, and the first bulb is operated at a low rated voltage, which secures in this range a good light yield. If the voltage of the dynamo exceeds the value 4.5 V, a switching over to the second bulb (or filament, respectively) is made and accordingly to the higher stabilized voltage level. Consequently an overvoltage at both bulbs is prevented in that a voltage limitation at their rated voltage is active for both.

In the range below the respective rated voltages the bulbs are operated at a fluctuating voltage of the dynamo, but yet at a relative good light yield.

Figure 4:
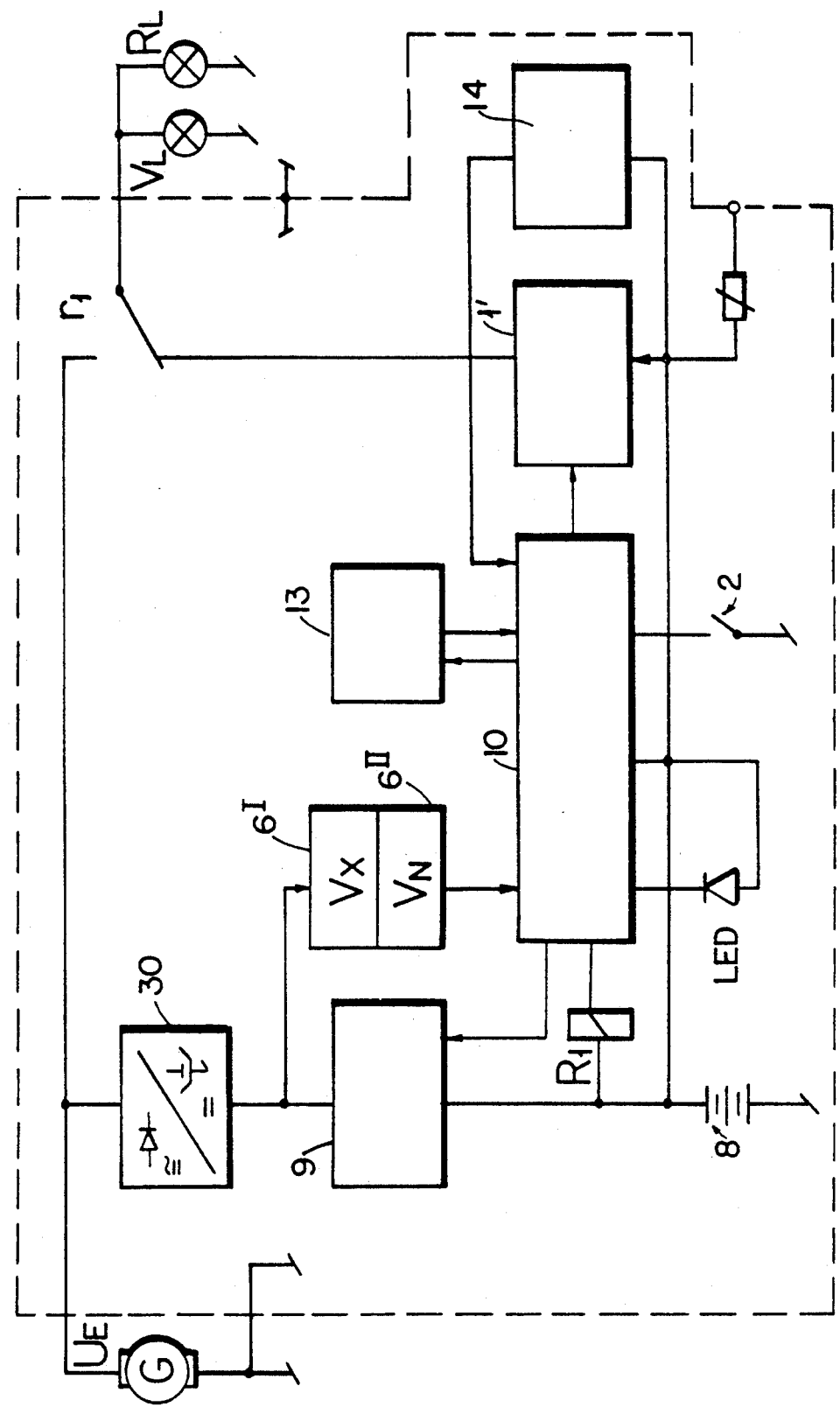
FIG. 4 illustrates a circuit for a second arrangement having only one bulb in the front light and rechargeable batteries.
Figure 5:
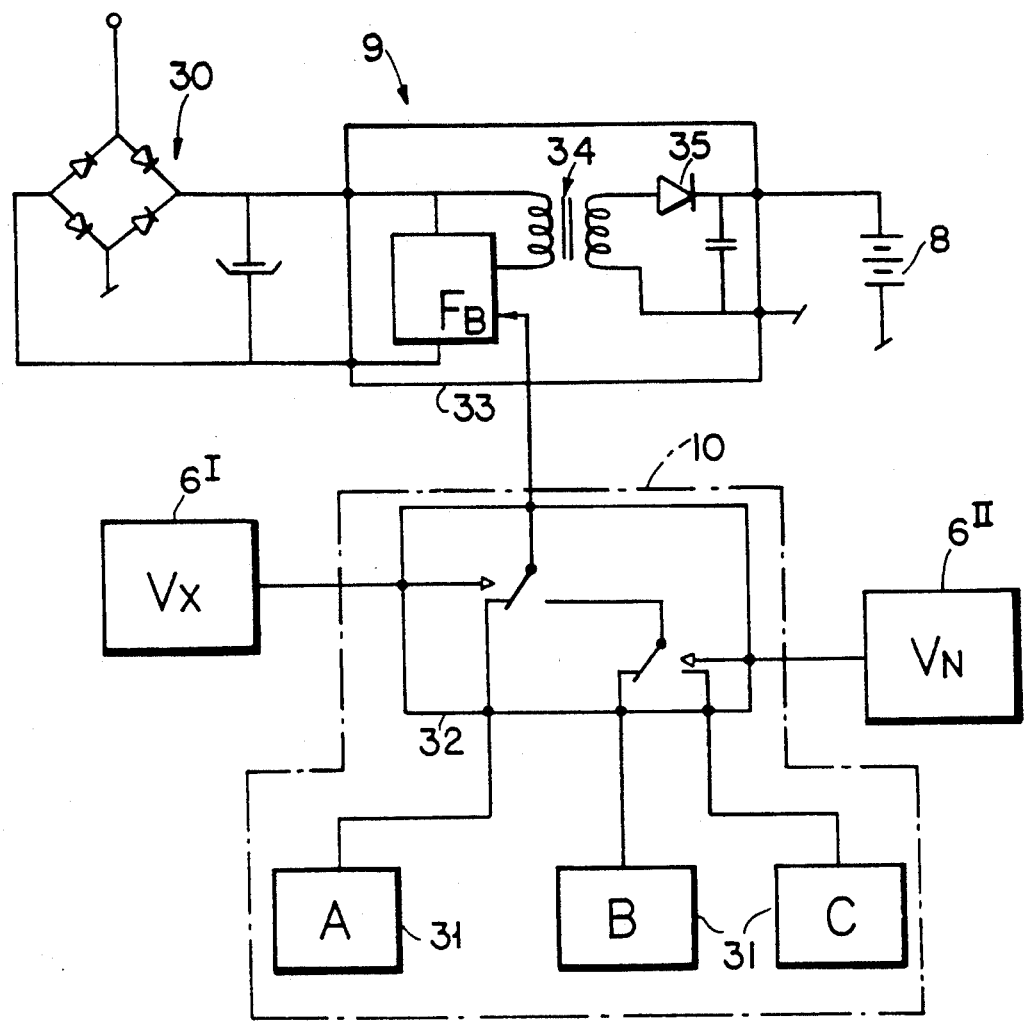
FIG. 5 is a block diagram of a part of the circuit in accordance with FIG. 4 in order to illustrate the charging controlling.
Figure 6:
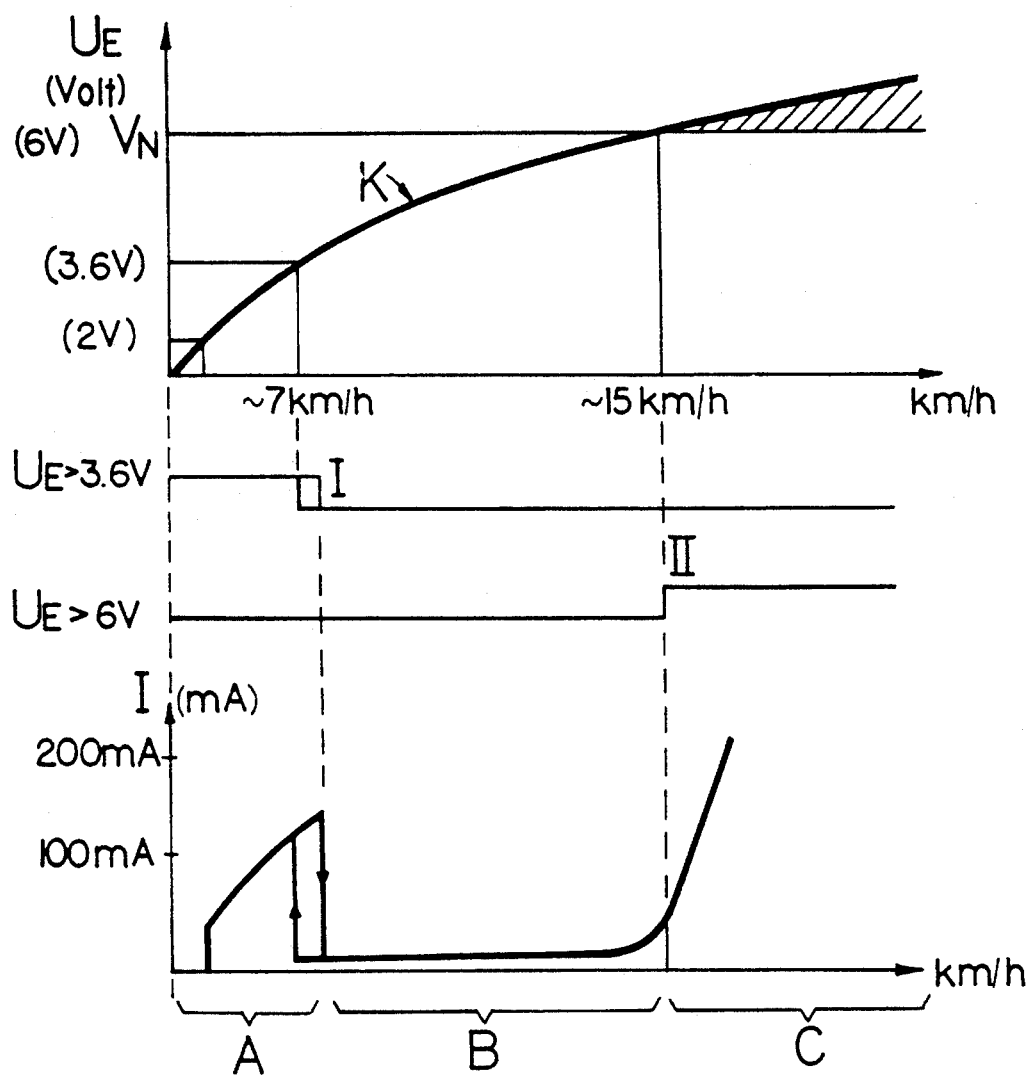
FIG. 6 is a diagram illustrating the switching conditions in dependence upon the speed.
Figure 7:
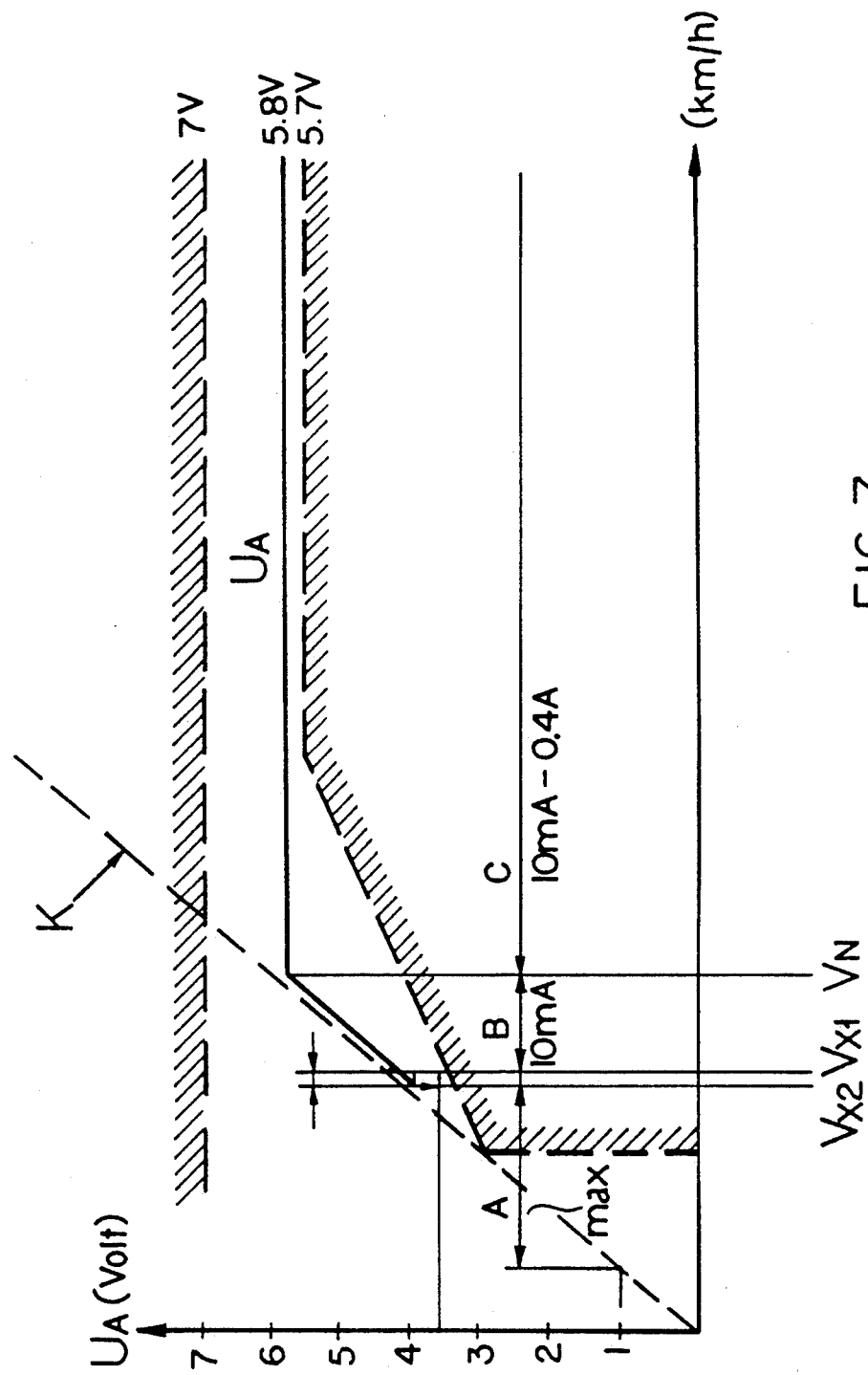
FIG. 7 is a voltage-speed-diagram in accordance with FIG. 6.
Figure 8:
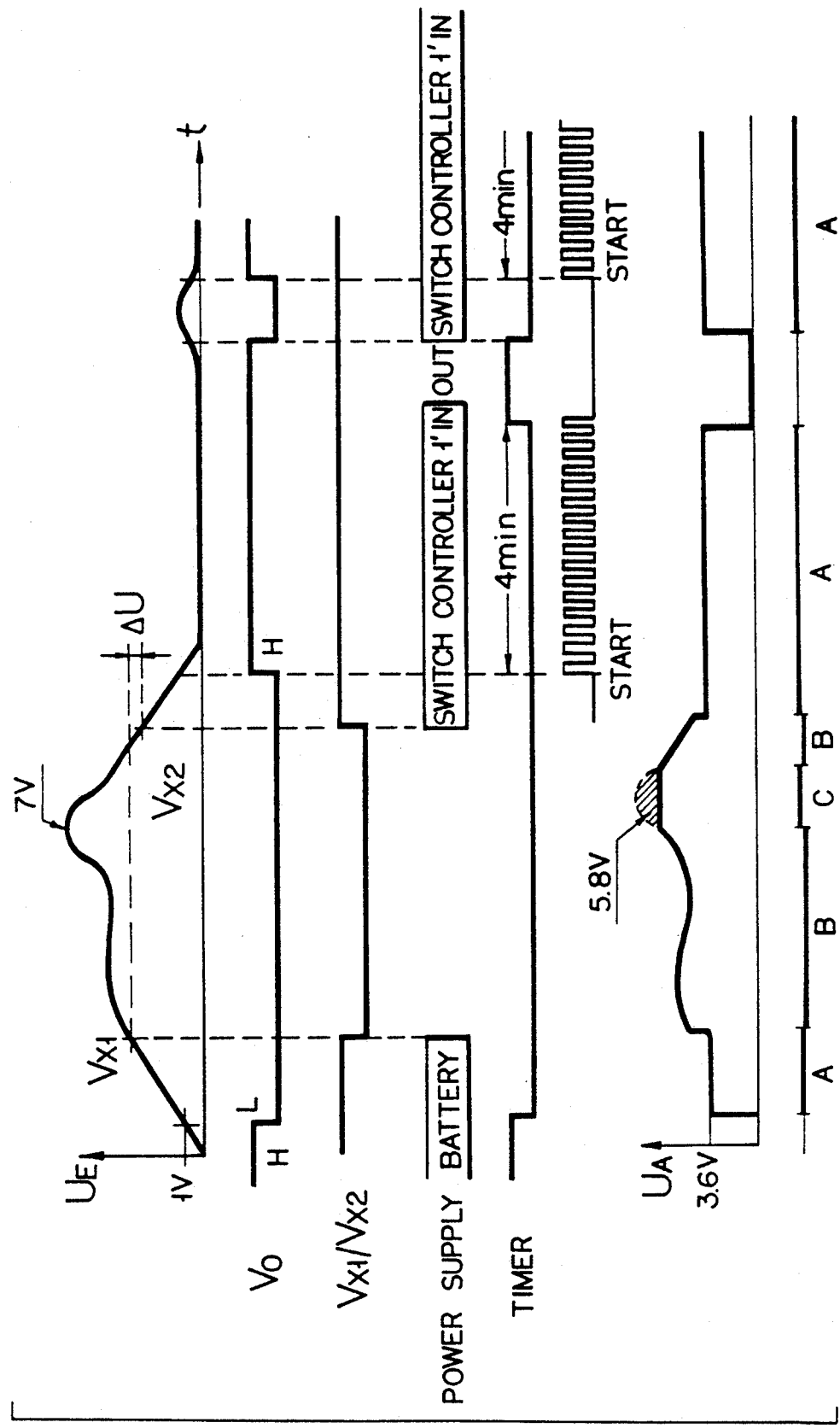
FIG. 8 is a speed-time-diagram of the circuit in accordance with FIGS. 4 and 5 for a running cycle.

In FIGS. 4 and 8 a further application of the principle of the circuitry is illustrated, whereby now the switching conditions which are adjusted to the voltage of the dynamo are not generated at the side of the bulbs, but rather at the side of the supply or the charging control, respectively, and are utilized for the stabilization of the voltage or optimal charging of a battery, respectively. Accordingly, in this embodiment rechargeable batteries 8 (with a rated voltage of 3.6 V) are provided at the feed side, which batteries 8 are connected via a battery charging converter 9, which is illustrated in detail in FIG. 5, to the dynamo G. The dynamo G has a voltage-speed-characteristic line K (FIGS. 6, 7). At the user side a front light $V_L$ with only one bulb and one rear light $R_L$ are provided, such that this plant can be operated with commonly available bicycle lights and bulbs.

In the here disclosed embodiment of the light electronics a differentiation between three operational states is made when the light is switched on, which operational states are hereinbelow identified by the letters A, B and C. In FIG. 6 these operational states are illustrated in dependence upon the speed of the bicycle. The first line in FIG. 6 depicts the voltage-speed-characteristic line K of the dynamo G. The second line depicts the switching over from the operational state A to the operational state B corresponding to the logic signal out of a first threshold switch $6^I$. The third line represents the corresponding logic signal of a second threshold switch $6^{II}$. Finally, at the lowermost line the charging current I for the battery 8 is depicted. The course of the output voltage $U_A$ present at the bulbs can be seen in FIG. 7.

The operational state A is present at stand-still or at a slow speed (up to e.g. 7 km/h) as long as the output voltage of the dynamo G remains below a first threshold value I of e.g. 3.6 V. At the operational state A the energy for the lamps is taken from the battery 8, and the energy of the dynamo generated is charged after a suitable DC/DC-conversion in the charging converter 9 to the battery 8.

If threshold value I is exceeded by a higher speed, a switching over into the operational state B is made as long as the full bulb voltage has not been reached yet. In this range the charging converter 9 operates as constant-small-current converter for a generation of a constant charging current of about 10 mA for the battery 8. This load corresponds roughly to the normal bulb-resistance tolerances and is thus allowable. It is, however, of importance for the battery 8 that it is also charged at the (most common) speed between about 6 to 14 km/h.

At speeds above about 15 km/h the voltage $U_E$ of the dynamo exceeds the rated voltage of the bulbs of 6 V. Here now the operational state C is taken into operation as long as a threshold value II of about 5.8 V of the dynamo voltage is reached. In this operational state the electronics operate to hold the voltage constant because when the rated voltage of the bulbs is exceeded, the lifetime thereof decreases greatly. The excess dynamo energy is charged into the battery 8. The charging current which is accordingly attainable can reach up to 250 mA (high speed-charging).

A corresponding design of a circuit is illustrated in FIG. 4. The standard dynamo G is connected via a rectifier 30 with a filtering to the electronics. It includes on the one hand a threshold switch 6 having a first threshold value I of the voltage $U_E$ of the dynamo at about $V_x = 3.6$ V and a second threshold value II at about $V = 5.8$ V. In FIGS. 4 and 5 the threshold-switch 6 is graphically separated correspondingly in two blocks. The threshold switch 6 determines the mentioned threshold values of te voltage of the dynamo and delivers corresponding control signals to a control logic 10. This control logic 10 possesses three control circuits 31, each of which is allocated to one of the mentioned operational states and accordingly are illustrated in FIG. 5 by corresponding blocks A, B, C. Depending upon the prevailing operational state one of these control circuits is connected via a logic 32 to the charge converter 9 and supplies corresponding control signals to same, such as can be seen in FIG. 5.

The charge converter 9 is switched between the rectifier 30 and the battery 8 and possesses also a switching controller 33, which receives via a feedback-input $F_B$ the control signals of the control circuits 31. The correspondingly controlled output signal of this switching controller is supplied via a transformer 34 and a rectifier arrangement (see FIGS. 1 to 3) as DC-current to the battery 8, as can be seen specifically in FIG. 5.

At the operational state A the controlling of the load occurs by an adjustment of the resistance that such the energy of the dynamo present in this range is optimally charged into the battery 8. The bulb receives thereby its energy completely from the battery, for which reason the voltage of the bulb does not fall below the voltage of the battery of 3.6 V. The control circuit 31 A operates in such a way that upon a reaching of the first threshold voltage I the load of the dynamo corresponds approximately to the load of the bulb (of about 12 $\Omega$). This is in order to keep the switching over hysteresis $\Delta U$ during the switching over into the operational state B at a small value, such that no large fluctuation of the brightness in the bulbs $V_L$ and $R_L$ occurs.

The switching over from the operational state A into the operational state B proceeds via hysteresis, such as specifically illustrated in FIGS. 6 and 7. The switching up from A to B proceeds at a somewhat higher voltage $V_{x1}$ than the switching back from B to A at the lower voltage $V_{x2}$. By means of such a continuous switching back and forth in this range of the running and accordingly a flickering of the light can be prevented.

In the operational state B the bulb receives the current from the dynamo (FIG. 7). Until the complete bulb voltage has been reached, it should not be loaded too strongly by the charging of the battery. In spite of this, it is important for the energy balance that a charging proceeds also in this range of speed which occurs often. As already explained, the switching controller 33 is, therefore, controlled by the control circuit B such that a small constant charging current of e.g. 10 mA is generated. Because this corresponds merely roughly to the standard bulb-resistance-tolerances, the light yield is not markedly negatively influenced by this.

If the rated voltage of the bulbs of 6 V is reached at speeds of about 15 km/h, the threshold switch $6^{II}$ switches the control circuit 31 C onto the charging converter 9. This control circuit controls the loading of the dynamo in such a way, that a voltage of 6 V by means of the controller load is not exceeded in any case. The energy of the overvoltage is charged into the battery (see FIGS. 6 and 8). When rolling downwards at a high speed it is thus possible to generate a charging current up to 250 mA and to achieve a high speed charging of the battery.

A switching controller 1' is arranged between the battery 8 and the bulbs. It stabilizes the voltage and the current, respectively, from the battery 8 or from the charging converter 9, respectively, which reaches the bulbs, to a value of e.g. 3.2 V, such that a constant brightness of the bulbs, which is positive for the safety, is secured. It becomes active in the operational state A at a low dynamo voltage.

When running with the dynamo and the light switched off (=charging) the circuit operates in the operational state A, i.e. the load of the dynamo corresponds to the load of the bulbs. The batteries are charged approximately by the energy which the bulbs would consume. The fully charged state is then detected by a battery control circuit 36 and indicated via the control logic 10 by means of a light emitting diode LED.

The light emitting diode indication allows the operator to recognize in any phase of the operation the state of the light plant. The indication proceeds for example as follows:

The diode is continuously lighted when the light is switched on and the capacity of the battery is between about 30% and 90%.

The diode flickers in a 1 Hz-cycle if the capacity of the battery falls during the running with light below about 30%.

The diode flickers at a 4 Hz-cycle if the light is switched off and the batteries are being charged until a battery capacity of about 90% is reached.

If the battery capacity is more than 90%, the LED-indication is inactive.

The battery control circuit 36 has, furthermore, a controlling function if the battery is present. If the battery 8 is not present or is largely discharged, this is determined by a presence-control-logic and stored in the control logic 10. In this case the described electronics remains inactive. The bulbs $V_L$, $R_L$ are in this case connected via a relay $R_1$, $r_1$ directly to the dynamo G (FIG. 4). The battery charging converter operates in this case in the operational state B, i.e. it generates a small charging current. By means of such, a low discharging protection for the battery 8 on the one hand and a safeguarding of the running with light on the other hand is reached.

The control logic can be operated by means of the key 2. If the key is depressed longer (longer than e.g. 0.25 sec), the memory in the control logic 10 can be set to "on", wherewith the light plant is switched on via the control logic 10. If the key is depressed for a short time span (less than 0.25 sec), the memory is set to "off" and the plant is shut off. A parking light-time 13 is connected, furthermore, to the control logic 10, whose function will be described further below.

An advantage of the described embodiment with battery support is the generation of the parking light. When the bicycle is stopped and accordingly the output voltage of the dynamo G falls to zero, the operational state of a battery supply at a voltage stabilized to 3.2 V occurs in accordance with the above description. Therefore, the light keeps on burning also at a reduced consumption in case it is switched on. If the voltage of the dynamo sinks below a minimal value Vo (of e.g. 1 V), this is determined by the threshold switch 6 and a signal for the control logic 10 is generated. This control logic 10 is connected to a timer circuit 13, which starts in this instance and counts during a predetermined time T (of e.g. 4 min). During this time span the switching controller 1' remains switched on and the light continues to burn. If the time is expired, the control logic switches the switching controller 1' off and the light is switched off, although the on/off-memory is still in the state ON. If the dynamo generates again a voltage which exceeds Vo (=1 V) or if the key is operated longer than 0.3 sec, the timer circuit 13 is set back and the switching controller 1' is switched on again, such that the light burns again stabilized at 3.2 V. By means of this switching on and switching off automatically, the parking light operation can be secured without any excessive consuming of the battery and without any special operation by the operator.

The described operational states are schematically combined in a plurality of diagrams belonging to each other in FIG. 8 to an arbitrary running profile.

As can be derived from this illustration, the bicycle light plant is designed such that at the side of the consuming and at the side of the supply as well a switching over between various operational states is made during the entire running cycle, of which states every one is optimally adjusted to the respective operational state. Consequently, it can be guaranteed that always an excellent light is available during normal running cycles, that the batteries are always charged and the resistance against the running remains limited.

Figure 9:
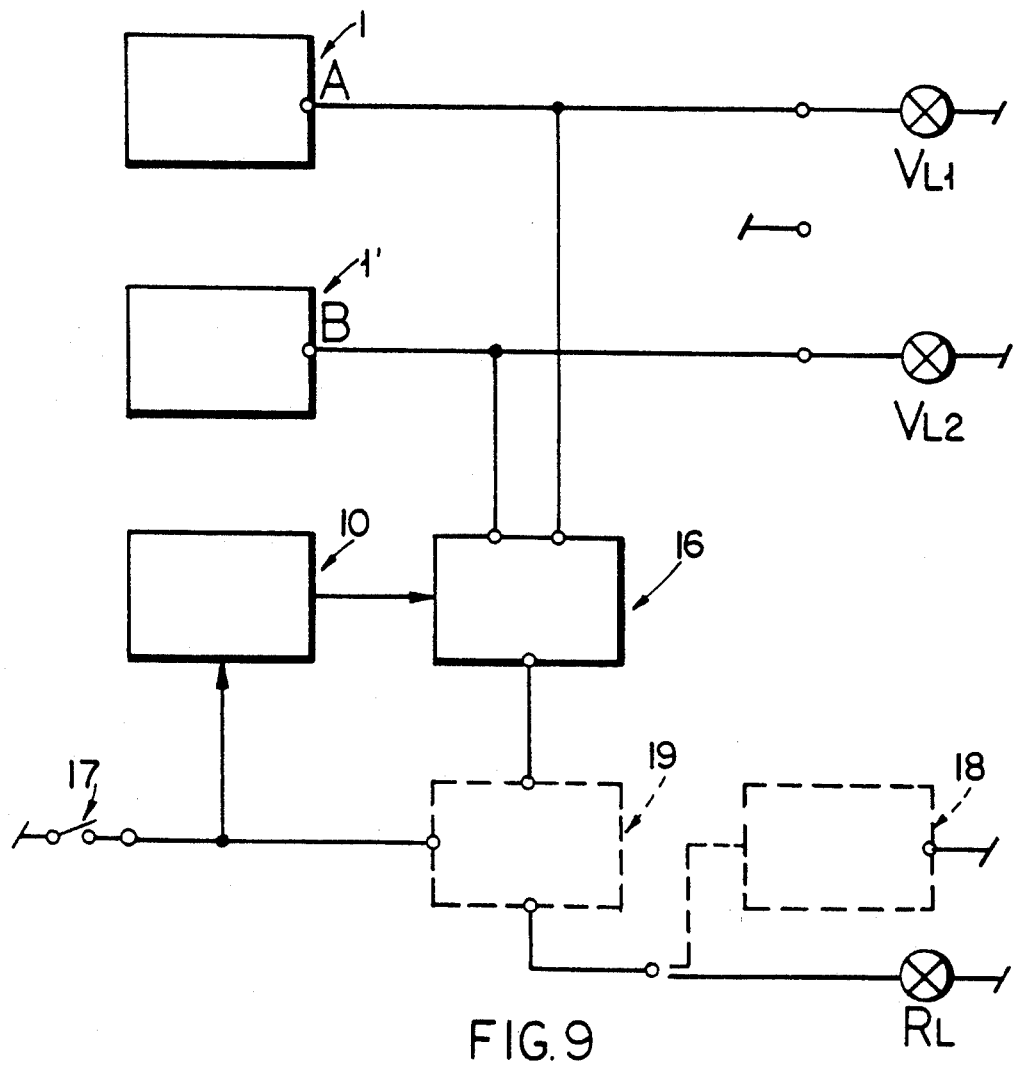
FIG. 9 is a block diagram of a third arrangement in accordance with FIG. 4, however with two different bulbs in the front light and further elements, such as a braking light.

Up till now plants have been described, in which alternatively it was only possible to switch between different operational states only at the side of the user or at the supplier side, which allows either the use of a common dynamo or of common bulbs, and now a plant is illustrated in FIG. 9, in which a switching is made between the operational states at the supply side and at the user's side as well. Hereto reference can be made extensively to the above description, whereby each switching controller 1 or 1' is connected with its own lamp (or filament, respectively) $V_{L1}$ and $V_{L2}$, respectively, of the front light. Preferably halogen lamps having two filaments of a different rated output are used for the front light. For the rear light $R_L$, furthermore, a switch 16 is provided, which connects the respective active switch controller to the rear light. Otherwise the plant operates as described above with the difference that during the switching between the two switching controllers a voltage step from 3.6 V to about 4.5 V occurs because the light value of the bulb $V_{L1}$ (3.6 V/1.2 W) corresponds roughly to the one of the bulb $V_{L2}$ (6 V/2.5 W) at an operational voltage of 4.5 V. By means of such, no difference regarding brightness is discernible during the switching between the two bulbs (or filaments, respectively). Furthermore, a braking light function is indicated in FIG. 9, which can be added to the rear light $R_L$. Hereto, on the one hand a brake contact 17 is provided in the area of the brakes and on the other hand a LED-rear light 18 is provided with two segments (see FIG. 11). The one segment acts as rear light in the night and the other one as braking light. Both are supplied via the same wire, whereby the transmission of the braking light is modulated by an additional electronics 19 and is decoded in the braking light. By means of this arrangement the same supply can operate selectively the rear light and/or the braking light. The compatability with a normal rear light is thereby guaranteed.

Figure 10:
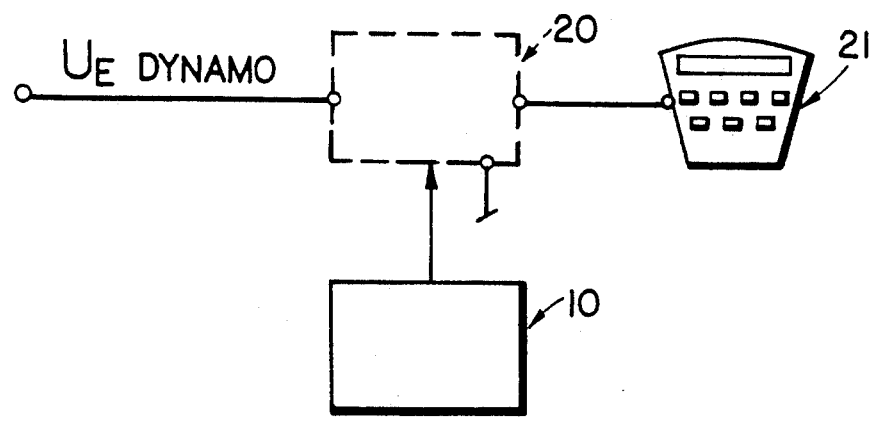
FIG. 10 is a block diagram of an additional indicating device.

Finally, FIG. 10 illustrates a control circuit 20 for an indicating and operating unit 21, which is connected to the control logic 10. It is possible to conclude from the measured dynamo-voltage $U_E$ the speed, from which the covered distance etc. can be calculated and indicated by means of a time measurement.

The heretofore described bicycle light plant can be operated by commonly available dynamos G.

Figure 11:
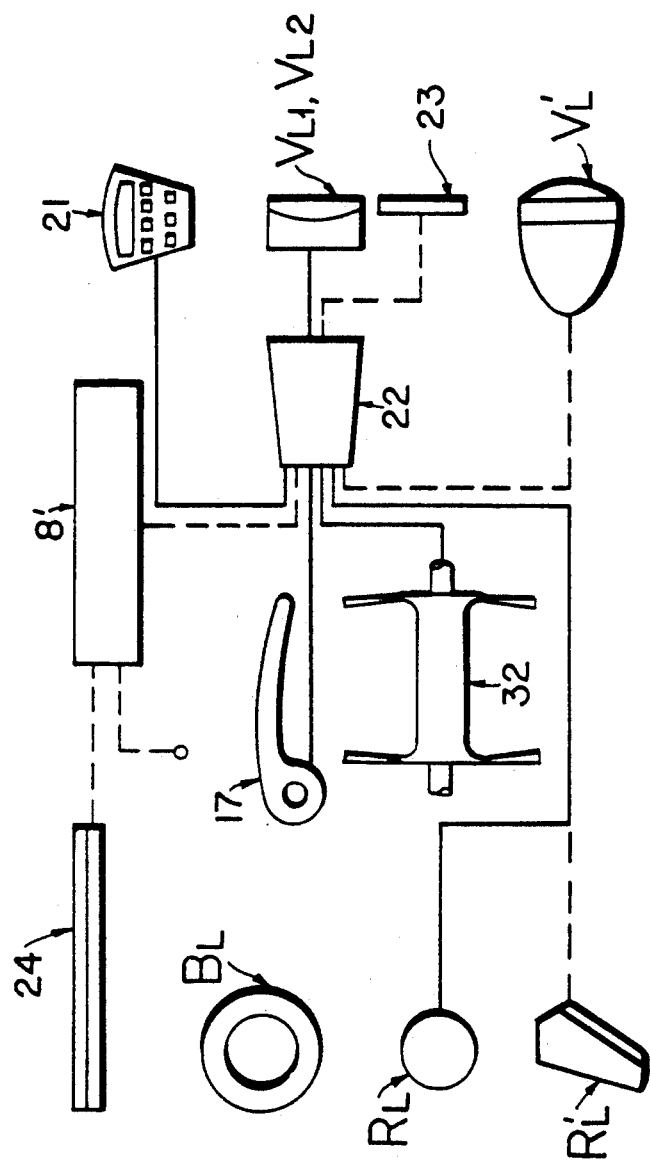
FIG. 11 illustrates an assembly of the components of a complete plant.
Figure 12:
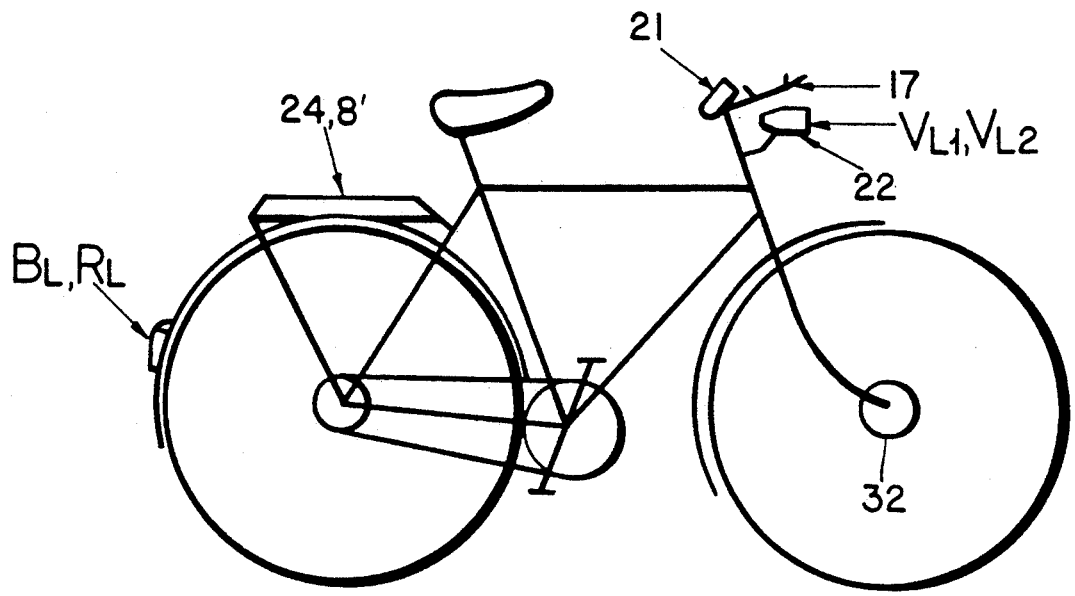
FIG. 12 illustrates a correspondingly equipped bicycle.
Figure 13:
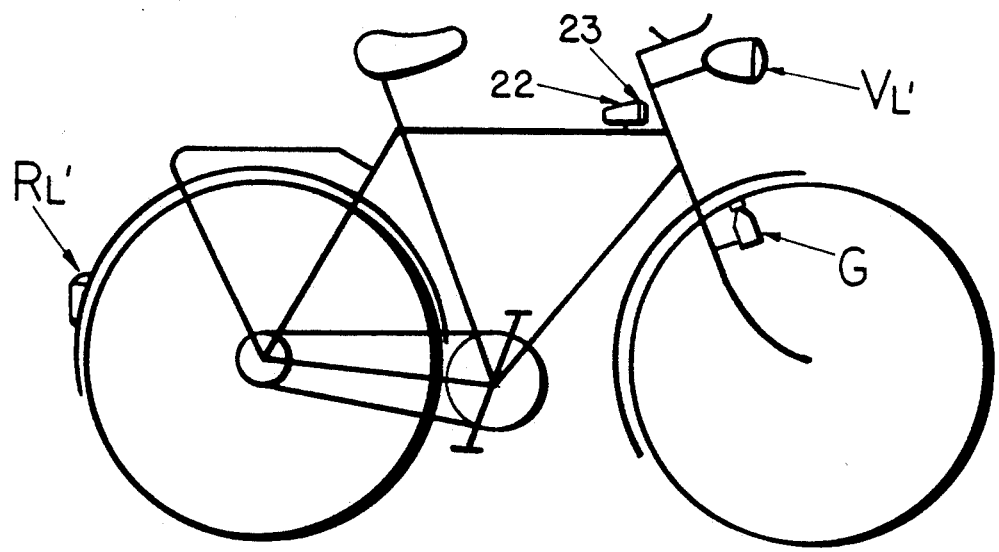
FIG. 13 illustrates a bicycle, in which the plant is combined with generally available lamps and a generally available dynamo.

The described bicycle light plant is composed of a plurality of components, which depending on the design state of the plant, may be replaced partly by generally available components. The plant is illustrated in FIG. 11 in a general overview and with its components. FIGS. 12 and 13 illustrate correspondingly equipped bicycles. The central part of the plant is an electronics housing 22, which contains the described electronics in the possible design modes. The electronics housing 22 acts preferably also as housing for the lamps of the front light in case it is equipped with two halogen lamps $V_{L1}$, $V_{L2}$ (or one bulb having two filaments, respectively). If the electronics is operated by a generally available front light $V_L'$, it is possible to place a cover 23 onto the housing 22 in place of the light part. This is then mounted at a suitable location on the frame of the bicycle (FIG. 13). Furthermore, a separate indicating unit 21 is provided, which is located in the field of vision of the driver (FIG. 12) and which includes the described LED-indicators and switches 11. The rechargeable batteries 8 are as a rule located in the electronics housing 22. In case an additional battery 8' or solar cells 24, respectively, are used, there can be located at the area of the baggage rack (FIG. 12). The electronics is connected to dynamo G, which e.g. may be a wheel hub dynamo. If a LED-rear light $R_L$ together with a braking light $B_L$ is used, this brake is correspondingly equipped with a feeler 17 for the braking light, which as has been described is connected to the electronics 22. It is, however, also possible to use a common rear light $R_L'$.

A bicycle is illustrated in FIG. 12, which is equipped with a completely equipped bicycle light plant having a hub dynamo 32, electronics 22 with halogen bulbs $V_{L1}$, $V_{L2}$, built thereonto, indicating unit 21, LED-rear light $R_L$ and braking light $B_L$ and solar cells 24. The electronics corresponds to the one of FIG. 6.

FIG. 13 illustrates in contrast thereto a bicycle plant in combination with a common front light $V_L'$, common dynamos G and a common rear light $R_L$. The electronics corresponds thereby to the one of FIG. 4.

As can be seen out of the above description, the bicycle light plant allows an economical operation which uses optimally the electrical power which is available and which secures in all running cycles of the bicycle a lawful, optimal light yield. It can be integrated into already existing bicycle light plants at various design states.

While there are shown and described present preferred embodiments of the invention, it is to be distinctly understood that the invention is not limited thereto, but may be otherwise variously embodied and practiced within the scope of the following claims.

I claim:

1. A light plant for bicycles comprising at least one light bulb, a dynamo driven by the bicycle, at least one switching voltage controller, a rechargeable battery, a charging converter for controlling charging of said battery, and control circuit means operating as a function of dynamo output voltage such that:
   at low dynamo output voltage, in a first operation range, said light bulb is driven by said battery and said charging converter is set to use all the power generated by said dynamo for charging said battery,
   at medium dynamo output voltage, in a second operation range, said light bulb is driven by said dynamo and said charging converter is set to use a small part of the power generated by said dynamo for charging said battery, and
   at high dynamo output voltage, in a third operation range, power corresponding to a nominal operation power of said light bulb is transferred from said dynamo to said light bulb, while said converter is set to use all remaining power of said dynamo for charging said battery.

2. The light plant of claim 1, wherein said control circuit means sets said charging converter to use all the power generated by said dynamo for charging said battery when said light bulb is switched off.

3. The light plant of claim 1, comprising a threshold switch for determining said dynamo output voltage and said ranges of operation of the light plant, said threshold switch having a hysteresis such that the transition between said first and second operation range occurs at a higher voltage than the transition between said second and said first operation range.

4. The light plant of claim 1, wherein said switching voltage controller controls the voltage to said light bulb in said third range of operation.

5. A light plant for bicycles comprising:
   at least one light bulb, a dynamo driven by the bicycle, at least two switching voltage controllers, a rechargeable battery, a charging converter for controlling charging of said battery and control circuit means including a threshold switch for monitoring output voltage of said dynamo, such that
   depending on the output voltage of said dynamo said charging converter is set to at least a first or a second charging state for adjusting the charging rate of the battery,
   depending on the output voltage of said dynamo said light bulb is supplied with voltage either from said dynamo or said battery, and
   wherein a first of said switching voltage controllers stabilizes the voltage of said dynamo to a preset higher bulb voltage and a second of said switching voltage controllers stabilizes the voltage of said battery to a preset lower bulb voltage.

6. A light plant for bicycles comprising:
   at least one light bulb, a dynamo driven by the bicycle, at least one switching voltage controller, a rechargeable battery, a charging converter for controlling charging of said battery and control circuit means including a threshold switch for monitoring output voltage of said dynamo, such that
   depending on the output voltage of said dynamo said charging converter is set to at least a first and a second charging state for adjusting the charging rate of the battery, and
   depending on the output voltage of said dynamo, said light bulb is switched off after the output voltage of said dynamo falls below a predetermined minimum voltage.

7. The light plant of claim 6, wherein said control circuit means comprises a timer circuit to switch off said light bulb after the output voltage of said dynamo is below said predetermined minimum voltage for a predetermined time interval.

* * * * *